April 12, 1955

M. CAMRAS 2,706,118

MAGNETIC RECORDER

Filed July 3, 1947

6 Sheets-Sheet 1

Inventor
MARVIN CAMRAS.

by The Firm of Charles W. Hills
Attys.

April 12, 1955 M. CAMRAS 2,706,118

MAGNETIC RECORDER

Filed July 3, 1947 6 Sheets-Sheet 2

Inventor
MARVIN CAMRAS.

by

Attys.

April 12, 1955 M. CAMRAS 2,706,118

MAGNETIC RECORDER

Filed July 3, 1947 6 Sheets-Sheet 3

Inventor
MARVIN CAMRAS by

Attys.

April 12, 1955

M. CAMRAS 2,706,118

MAGNETIC RECORDER

Filed July 3, 1947

6 Sheets-Sheet 4

Inventor
MARVIN CAMRAS by The Firm of Charles W. Hills
Attys.

April 12, 1955 M. CAMRAS 2,706,118

MAGNETIC RECORDER

Filed July 3, 1947 6 Sheets-Sheet 5

Inventor
MARVIN CAMRAS.
by [signature] Attys.

Inventor
MARVIN CAMRAS.

The Firm of Charles W. Hills
Attys.

United States Patent Office 2,706,118
Patented Apr. 12, 1955

2,706,118

MAGNETIC RECORDER

Marvin Camras, Chicago, Ill., assignor to Armour Research Foundation of Illinois Institute of Technology, Chicago, Ill., a corporation of Illinois Application July 3, 1947, Serial No. 758,769

6 Claims. (Cl. 274—4)

This invention relates to magnetic recording and reproducing apparatus, and more particularly to such apparatus employing an endless sheet record member.

It has long been known that an intelligence could be recorded on a magnetizable record member by passing the record member over a head which varies the magnetic state of an incremental length of the record member in accordance with time variations of the intelligence. In reproduction, the record member is again passed over the head in the same direction and the condition or state of the record member along an incremental length thereof is reproduced as a signal, thereby converting the variations in the magnetic state of the record member along its length to a time varying signal corresponding to the recorded intelligence.

A wide variety of apparatus has been developed in the past for effecting such operations. Perhaps the commonest form of record member is a long wire which is caused to pass from one reel to another, and an electromagnetic transducer head being interposed in the path of travel of the wire so that the wire passes over or through the head.

Another common form of record member has been a narrow tape which is also transferred from one reel to another. Disks and cylinders have also been used, and many machines in the prior art have employed endless loops of wire or tape.

One of the principal disadvantages of any of these various types of magnetic recording and reproducing apparatus lies in the fact that to skip from one portion of the record member to another it is necessary to either rewind the record member or advance it in a forward direction until the new spot is reached. When several selections of music are recorded on a record member, and it is not desired to play-back the record in the order in which they appear on the record member, or it is not desired to play a portion of one of the records at all, this necessity of rewinding or advancing the record member to the new selection has proved quite objectionable.

Magnetic recording machines of the disk type and of the cylinder type have obviated this difficulty, but both of these types of record members have been able to carry only a relatively short recording and the fidelity of reproduction has not been particularly good.

One of the principal features and objects of the present invention is to provide a novel recording and reproducing apparatus which overcomes the difficulties referred to above.

Another object of the present invention is to provide a novel magnetic recorder of the endless sheet type.

A further object of the present invention is to provide a novel magnetic reproducing apparatus in which various portions of the recording may be arbitrarily selected and immediately reproduced irrespective of their relative location on the record member.

Another and further object of the present invention is to provide a magnetic recorder having novel record member supporting and handling means.

Still another object of the present invention is to provide a novel drive mechanism for a magnetic recording and reproducing apparatus.

Still another and further object of the present invention is to provide a novel magnetic record member.

The novel features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawings, in which:

In describing certain illustrated embodiments of the present invention, and as used throughout, the term "magnetic recorder" will be employed to designate a magnetic recording apparatus or a magnetic reproducing apparatus or a magnetic recording and reproducing apparatus. The term "electromagnetic transducer head" will likewise be employed to designate a head which may be used for making a magnetic record or for reproducing a magnetic record or for erasing or for doing all three.

Figure 7:
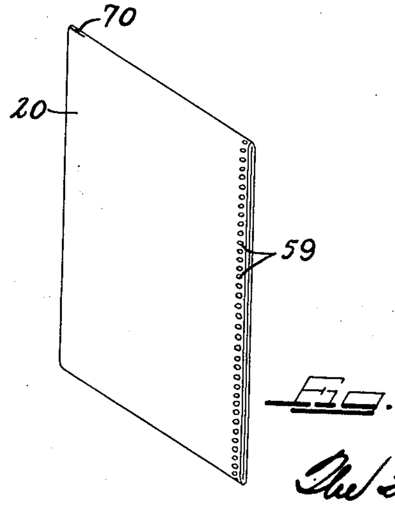
Figure 7 is the same record member as shown in Figure 6 but folded flat to facilitate storage or mailing.

The magnetic recorder which is illustrated in Figures 1 to 5 of the drawings, includes a base 11 with an upright supporting wall 12 mounted at the left end thereof and secured to the base 11 by means of an angle iron 13 which is bolted or otherwise suitably secured as at 14. All of the principal apparatus is mounted on this upright end wall 12, including the motor 15 which is secured to the end wall 12 by means of a bracket 16. A long drum or cylinder 17 mounted on a shaft 18 is carried in a bearing 19 mounted in the end wall 12 and extends into the drum 17. This roll or drum 17 is supported at one end only, and for that reason is free at its opposite end to have a record member 20 slipped thereover, the record member 20 being in the form of a relatively wide endless sheet of flexible material having a coating of magnetizable material thereon. It has been found in practice that the shape and relative dimension of this endless loop record member afford the greatest convenience and enables the most efficient operation of the apparatus hereinafter to be described when the longitudinal axis of the loop is greater than the width of the record member and less than three times the width of the record member. It has been further found that when the endless sheet record member 20 lies flat as shown in Figure 7 of the drawings, an extremely efficient and effective size is to have its width approximately eight and one-half inches and the length of its longitudinal axis eleven inches. Thus, the record member when lying flat approximates a conventional sheet of letter paper. It has also been found desirable under certain circumstances to use a record member which, when folded flat, is approximately three and one-half to four inches wide and five to eight inches long.

The capstan drum 17 preferably has a rubber or other yieldable surface such as cork or the like. This yieldable surface has been found to give a better drive with less slippage and also allows the surface of the record member to yield to conform to the contacting surface of the transducer head 46 presently to be described.

The shaft 18 is of sufficient length to extend through the end wall 12 and somewhat beyond which thus enables a drive roller 21 to be secured thereon. The drive roller 21 is mechanically (i. e. frictionally) driven from the shaft 22 of the motor 15 by means of an intermediate rubber roller 23 which is rotatably mounted on a pivotally mounted arm 24, the pivot point being at 25. The arm 24 is biased by means of a spring 26 in a clockwise direction about its pivot point 25, thereby to force the intermediate roller into engagement with the motor shaft 22 and the large drive roller 21 (see Figure 4). Rotation of the motor drive shaft 22 thus causes rotation of the drum 17 which carrier the endless sheet magnetic record member 20.

The drive roller 21 is preferably of sufficient mass so as to act as a flywheel or stabilizing member.

A second drum 27 carried on a shaft 28 is mounted for free rotation on an arm 29 which is pivotally supported on the end wall 12 by means of a stud 30, which is threaded over at least an end portion to carry a nut 31. This lower drum 27 is thus like the drum 17 supported at the left end only, and for that reason is arranged to have the endless magnetic sheet record member 20 slipped thereover.

Figure 5:
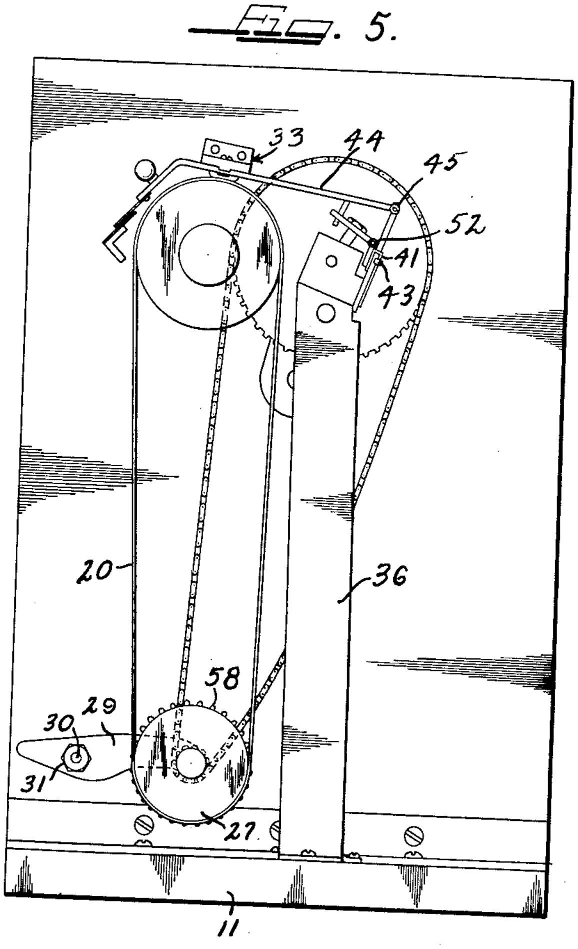
Figure 5 is a right-end view of the recorder shown in Figure 1.
Figure 10:
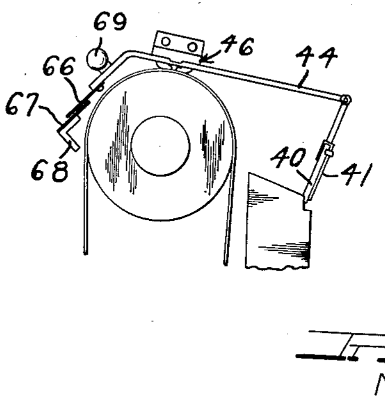
Figure 10 is a fragmentary enlarged right-end view of the recorder head assembly and upper drum of the form shown in Figures 8 and 9.

It further will be observed from an inspection of Figure 5 that due to the floating mounting of the drum 27, the weight of the drum 27 will suitably tension the endless sheet record member 20 so as to hold it in a tight wrap about the upper drum 17. The record member 20, on the other hand, may be quickly mounted on the machine and removed therefrom simply by rocking the arm 29 slightly upwardly (that is, in a counter-clockwise direction as viewed in Figure 5 of the drawings) which shortens the distance between the upper drum 17 and the lower drum 27. After the endless sheet record member 20 has been slipped over the two drums 17 and 27, the arm 29 is released and the weight of the lower drum 27 will tension the endless sheet record member 20 as hereinbefore pointed out.

Because of this, the upper roll 17 acts as a capstan drive for the endless sheet record member 20, and if the drum 17 is driven at uniform speed, the endless sheet record member 20 will be moved at uniform speed.

One of the important features of the present invention lies in the manner in which the lead screw 32 which carries the head assembly 33 is driven. One of the principal disadvantages of an ordinary cylinder-type magnetic recorder in the past has been that the driving of a load directly from the shaft of the record member drive has caused "wow" in the reproduction.

It has been found that fidelity of reproduction and elimination of "wow" has been radically improved by the present invention in which the lead screw 32 is driven not from the capstan drum 17 or its associated shaft 18, but rather is driven only indirectly therefrom, the power take-off being taken from the floating lower drum 27. More particularly, the lead screw 32 is mounted at the left end in a supporting block 34 and at the right end in a supporting block 35 which is carried on an upright post 36 mounted at the right-hand end of the base 11. A sprocket wheel 37 is secured to the lead screw 32 in proximity to the end wall 12.

A small sprocket wheel 38 is secured to the shaft 28 of the lower drum 27. A sprocket chain 39 extends over the sprocket wheels 37 and 38 and is of such length as not to inhibit or prevent the tensioning of the endless sheet record member 20 by the downward movement of the floating lower drum 27. As is clearly shown in Figure 4 of the drawings, the lead screw 32 is rotated from the motor drive shaft 22 through the intermediate roller 23, the drive roller 21 of the capstan drum 17, through the endless sheet record member 20, the lower floating drum 27, and the sprocket chain 39. The fact that the drive for this lead screw 32 is taken through the endless sheet record member 20 itself and the floating lower drum 27 has been found to vastly increase the fidelity of reproduction and a substantial reduction of "wow" and flutter.

Figure 2:
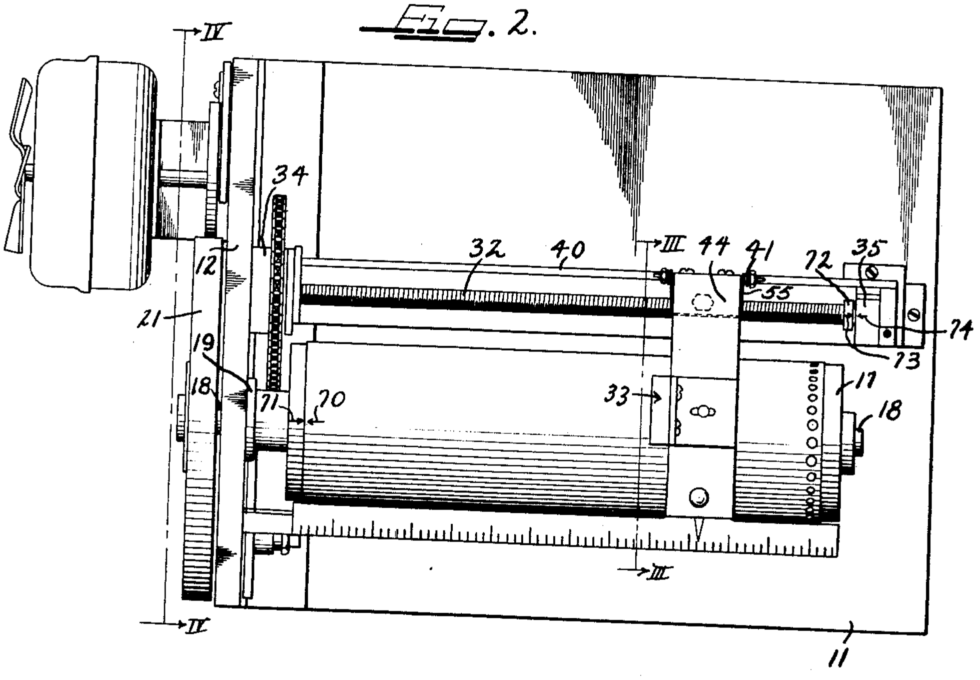
Figure 2 is a plan view of the recorder shown in Figure 1.
Figure 3:
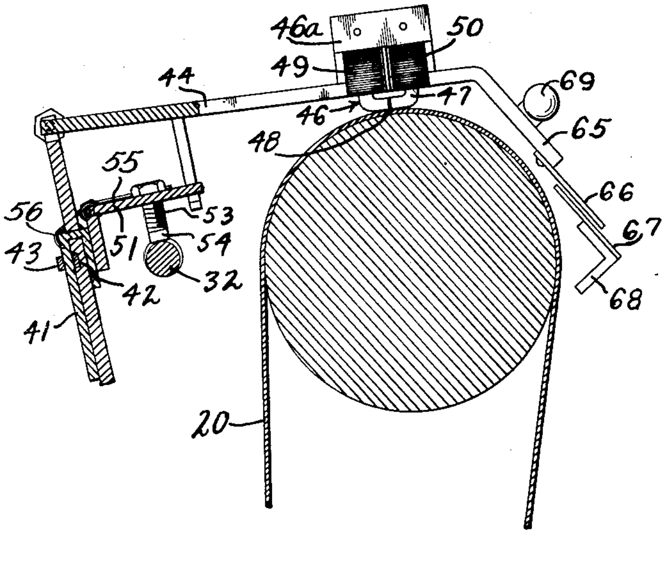
Figure 3 is an enlarged sectional view of a portion of the recorder as taken along the line III—III of Figure 2.
Figure 4:
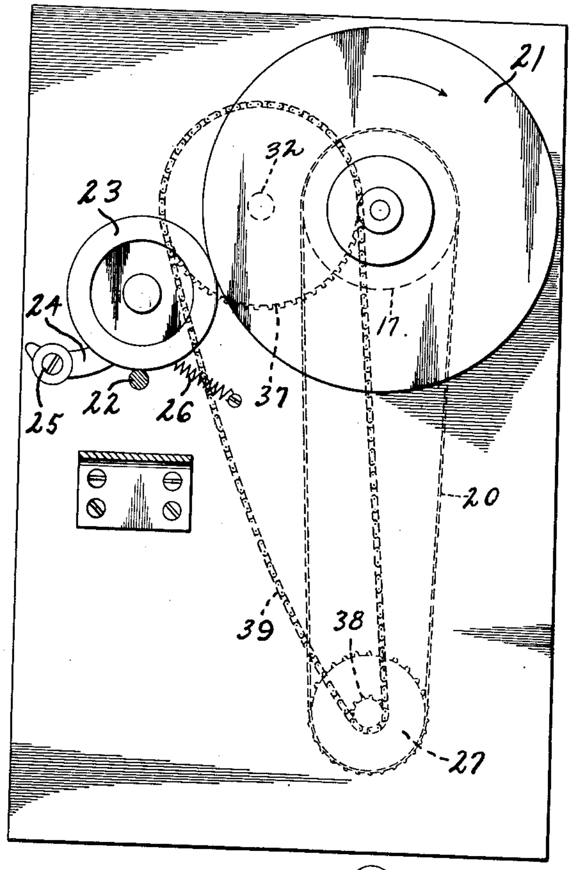
Figure 4 is a sectional view through the recorder as taken along the line IV—IV of Figure 2.
Figure 6:
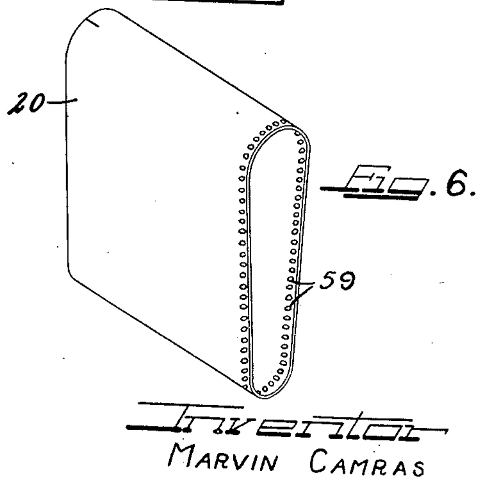
Figure 6 is an isometric view of the record member employed on the machine illustrated in the preceding figures.

The head assembly 33 which is caused to advance across the length of the capstan drum 17 by the lead screw 32 may be seen best in Figures 2, 3 and 5 of the drawings.

A guide plate or rail 40 is mounted to the rear of the lead screw 32 on the blocks 34 and 35. A carriage 41 is slidably mounted on the rail 40. The rail 40 is provided with a channel or groove 42 along the rear face thereof in which a cooperating member or pin 43 on the carriage 41 rides. A long arm 44 is pivotally mounted as at 45 to the carriage 41. The arm 44 carries the electromagnetic transducer head 46, the head 46 being mounted in a bracket 46a in a position where the head lies over the endless sheet record member 20 as it passes over the capstan drum 17. The electromagnetic transducer head 46 includes a core 47 having a pair of confronting pole portions which define a non-magnetic gap 48 adjacent the endless sheet magnetic record member 20.

A pair of signal coils 49 and 50 are mounted on the core 47 and when energized with a signal to be magnetically recorded on the endless sheet record member 20 set up a fluctuating magnetic field in the gap 48. When a magnetic record is already on the record member 20, a flux is set up in the core 47 which induces a current in the coils 49 and 50 substantially proportional to the recorded signal.

Also mounted on the carriage 41 is a second arm 51 which is pivotally mounted to the carriage 41 as at 52. The arm 51 carries a follower 53 which may conveniently be in the form of a bolt having a tapered or sharpened end 54 which is arranged to ride in the threaded lead screw 32. A spring 55 secured to the carriage 41 as at 56 bears against the outer free end of the arm 51 and normally maintains the follower 53 in engagement with the lead screw 32.

It will thus be understood that as the lead screw 32 is rotated the carriage 41 is gradually advanced from one end of the capstan drum 17 to the other. The electromagnetic transducer head 46 thus follows a spiral path around the endless sheet record member 20. By having a fine lead screw 32, adjacent portions of the spiral path on the endless sheet record member 20 lie quite close together, and in practice it has been found that these adjacent portions may conveniently be approximately $\frac{1}{32}$ of an inch apart.

It will thus be understood that while the endless sheet record member 20 is of relatively limited length around, the actual length of the spiral path is many, many times the length of the sheet. The record member has the further convenience of being able to be folded flat as shown in Figure 7 of the drawings, so that in its flattened position it may be conveniently, for example, in the size of an 8½ x 11 sheet. It can then be folded further in any suitable manner so as to be inserted in an ordinary mailing envelope, or it may be stored in the form shown in Figure 7.

By virtue of the fact that the carriage 41 may be instantly moved from any position along the capstan drum 17 to any other position therealong by simply lifting the arms 44 and 51 so as to disengage the follower 53 from the lead screw 32 and the carriage 41 slid along the track 40, any portion of the record may be played at will.

In order that there will be no slippage between the endless sheet record member 20 and the capstan 17, or between the record member 20 and the lower drum 27, the right-hand end of the drum 27 may be provided with a circumferential row of teeth or sprockets 58, respectively, which cooperate with a row of perforations 59 along one edge of the endless sheet record member 20. These may, however, be eliminated if the coefficient of friction between the record and drum 27 is sufficiently high so that no slippage occurs.

The recording apparatus as above described is preferably provided with an indexing arrangement to inform the operator at all times of the exact relative position of each portion of a recording. To this end, the arm 44 has a down-turned end portion 65 which carries an index finger 66 which extends in slightly spaced relationship over the top of an indexing plate 67 mounted immediately in front of the capstan drum 17. The indexing plate may be mounted in any suitable manner such as by means of a bracket 68 carried on the end plate 12.

Any suitable scale or indexing marks may be placed on the indexing plate 67 for the convenience of the operator. Also for the convenience of the operator, a knob or handle 69 is provided on the down-turned portion 65 of the arm 44 to enable convenient lifting and movement of the arm 44 and the carriage 41.

In order that the record member 20 may be replaced on the machine in a position where it is properly synchronized with the movement of the recording and playback head 46, the record member 20 is preferably provided with a synchronization mark 70 which is arranged to cooperate with a synchronization mark 71 on the capstan drum 17. Thus, when the record 20 is slipped onto the drum 17, the synchronization mark 70 is moved into a position exactly opposite the synchronization mark 71 on the drum (see Figure 2).

Also for the purpose of synchronization, a collar 72 is provided on the lead screw 32, and this collar 72 has a synchronization mark 73 thereon. The bearing block 35 is provided with a synchronization mark 74. When a record is to be replaced on the drum 17, the lead screw will first be turned so that the synchronization mark 73 of the collar 72 is opposite the synchronization mark 74 of the bearing block 35, and the record member 20 is then placed on the drum 17 with its synchronization mark 70 opposite the synchronization mark 71 as just described.

Figures 8 to 12 of the drawings illustrate a second embodiment of the present invention wherein the lead screw is eliminated and the carriage is tracked by a spiral groove 60 in the sheet record member 20. More particularly, the carriage 41 which is slidably mounted on the track 40 does not have the second arm 51 thereon which was described in connection with the first embodiment of the invention, but has only the arm 44 carrying the electromagnetic transducer head 46.

Figure 1:
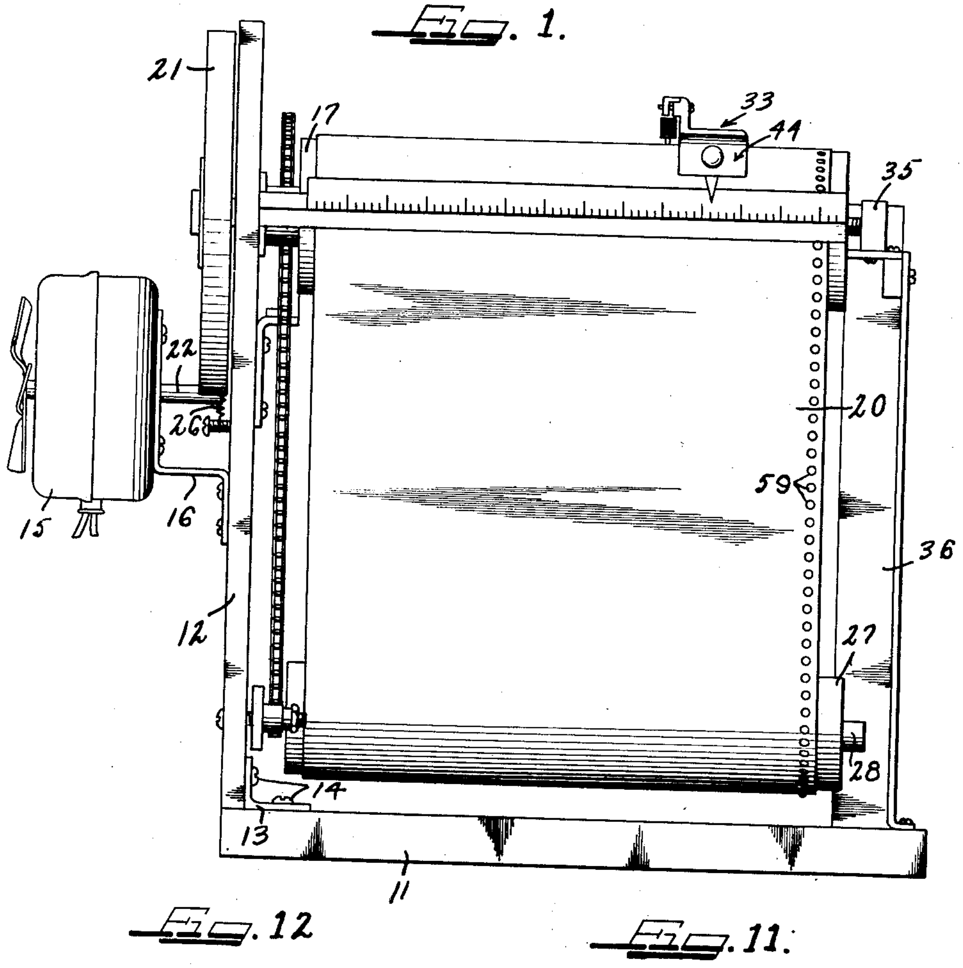
Figure 1 is a front elevation view of a magnetic recorder embodying the novel principles and teachings of the present invention.
Figure 12:
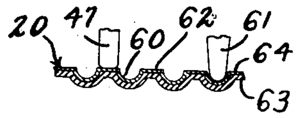
Figure 12 is a greatly enlarged fragmentary view of the magnetic pole piece and guide finger of the form of the invention shown in Figures 8 to 11 of the drawings.
Figure 11:
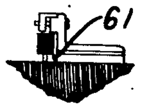
Figure 11 is a fragmentary front elevation of the electromagnetic transducer head mounting and record member shown in Figures 8 to 10.

The electromagnetic transducer head in this form of the invention includes an additional finger 61 which is a tracking finger and rides in the groove 60 of the endless sheet record member 20 as is shown in Figure 12 of the drawings. The head itself is arranged so that the core 47 rides on the land 62 which lies between adjacent portions of the spiral groove 60. Thus, as the endless sheet record member 20 is moved by the capstan drum 17 with the guide finger 61 in the groove 60, the carriage 41 is advanced from one end of the capstan drum 17 to the other. The spacing between the core 47 of the electromagnetic transducer head 46 and the guide finger 61 is such that the core 47 is always maintained on the land 62 between the grooves.

As shown in Figure 12 the endless sheet record member 20 includes a principal body portion 63 which may conveniently be of paper or plastic, and has a coating of ferromagnetic material 64 disposed thereover. If desired, the coating of ferromagnetic material 64 may be eliminated from the groove 60 so that only the land 62 is covered with the ferromagnetic material. Similarly, the head 46 may be so spaced with respect to the guide finger 61 that the core 47 also rides in the groove 60. In such event, it will, of course, be understood that the ferromagnetic material is preferably disposed in the groove as shown in Figure 12. Furthermore under such circumstances the guide 61 may be eliminated and the head itself used as its own tracking means.

Figures 8, 9:
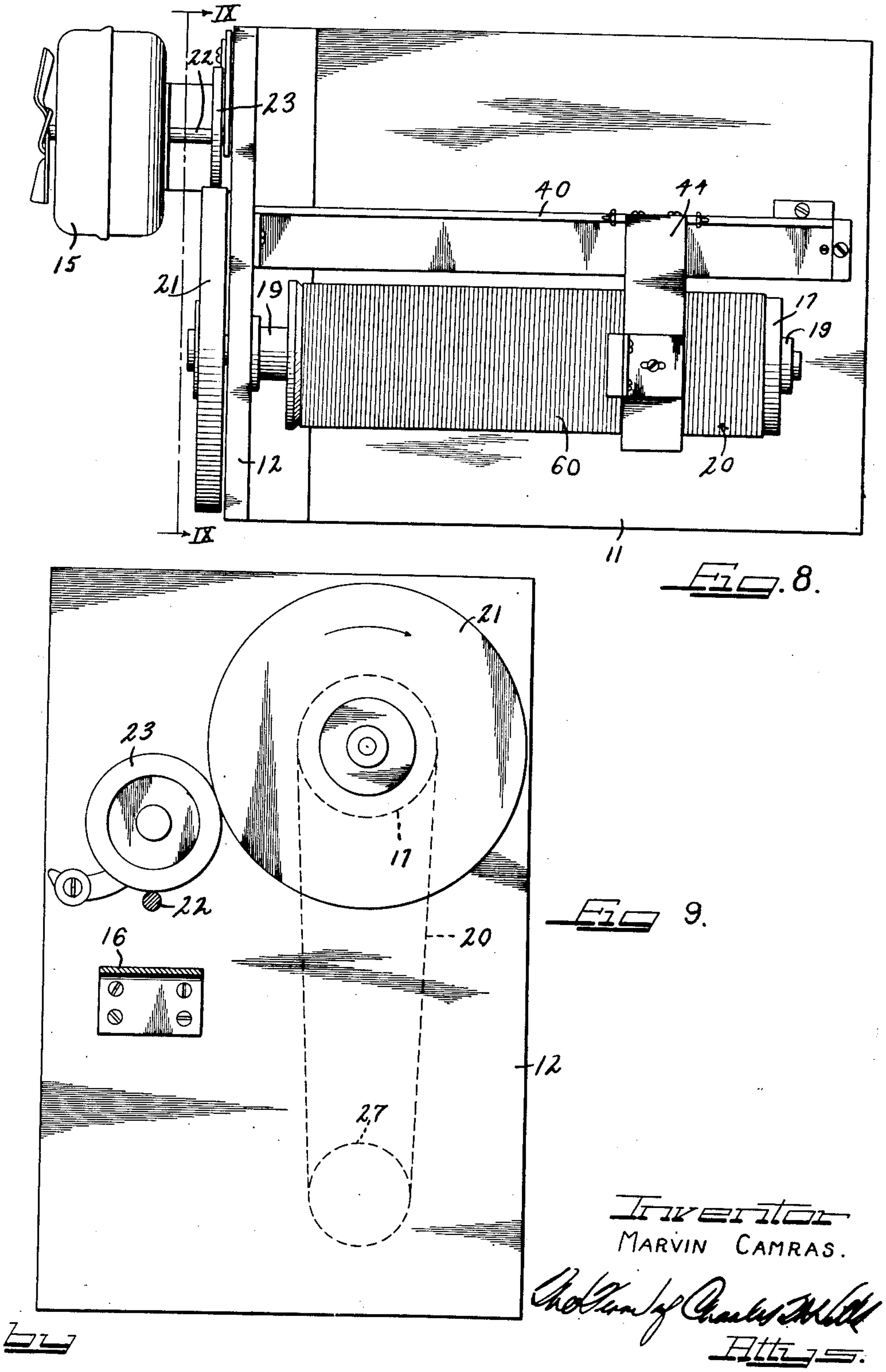
Figure 8 is a view similar to Figure 2 but illustrating a modified form of the present invention in which no lead screw, no sprocket and no chain drive from the lower floating drum is provided.
Figure 9 is an end view of the modified form of the invention shown in Figure 8 as taken along the line VIII—VIII.

It will be observed in considering this form of the present invention, and particularly as evidenced from an inspection of Figures 8 and 9 of the drawings, that the sprockets or teeth on the lower drum 27 have been eliminated as have also the sprocket chain 39 and the lead screw 32.

Figures 13, 14:
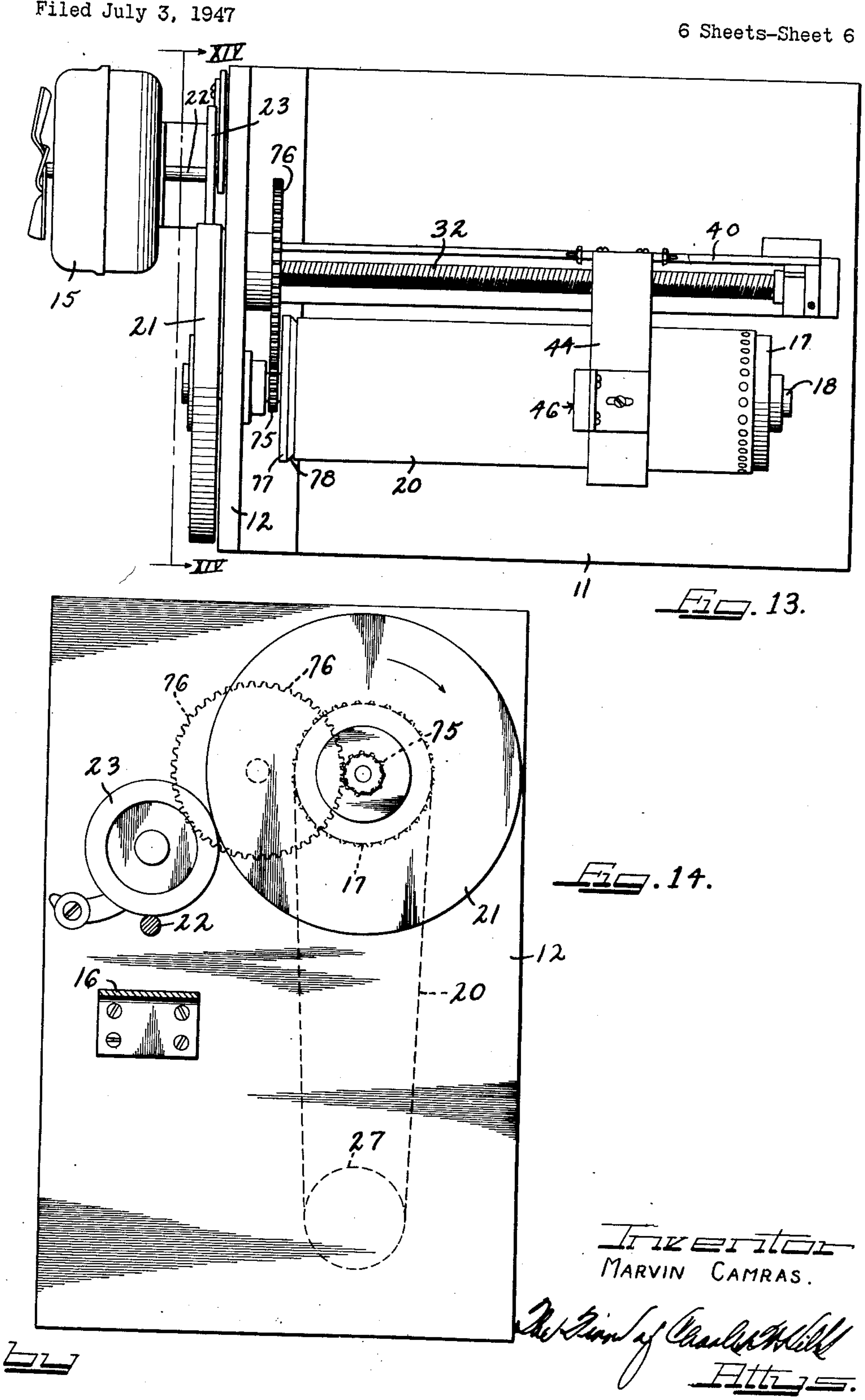
Figure 13 is a view similar to Figure 2 but shows a third embodiment of the present invention wherein the lead screw for the recorder head assembly is directly driven from the capstan drum.
Figure 14 is a right-end view of the form of the invention as taken along the line XIV—XIV of Figure 13.

A third embodiment of the present invention is illustrated in Figures 13 and 14 of the drawings. In this form of the invention, the lead screw 32 is used as it was in the first form of the invention, but here the lead screw 32 is directly driven from the capstan drum drive through gears 75 and 76. The gear 75 is mounted on the shaft 18 which carries the capstan drum 17, while the gear 76 is mounted on and secured to the lead screw 32. The gear ratio may be any suitable ratio to give the desired speed of rotation to the lead screw 32 for advancement of the carriage 41.

It will be observed that in this form of the invention no teeth are necessary on the floating drum 27 but should be used on the capstan drum 17 so that the lead screw will remain in synchronism with the capstan drum 17.

In order to suitably and quickly line up the record number 20 on the capstan drum 17, the end of the drum 17 opposite the end wall 12 is preferably provided with a flange 77 against which the record member 20 may be pushed. When mounting the record member 20 on the drum 17, preferably the face of the flange 77 is beveled as at 78 to prevent undue wear on the edge of the record member 20 which lies thereadjacent.

While I have shown several particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A magnetic recorder comprising a drive cylinder supported at one end only, drive mechanism for rotating said drive cylinder, a second cylinder disposed parallel to said drive cylinder and mounted for limited movement toward and away from said drive cylinder, an endless sheet magnetizable record member extending around said cylinders and supporting said second cylinder from said drive cylinder, said endless sheet record member being readily removable from the unsupported ends of said cylinders, an electromagnetic transducer head mounted for transverse movement across said endless sheet record member and traversing mechanism for moving said head across said record member as said drive cylinder is rotated, said traversing mechanism being driven from said second cylinder.

2. A magnetic recorder comprising a drive cylinder, a second floating cylinder, an endless sheet magnetizable record member extending around said cylinders and supporting said second cylinder from said drive cylinder, said second cylinder having a circumferentially disposed row of sprocket teeth at one end thereof, said second cylinder being disposed parallel to said drive cylinder and mounted for limited movement toward and away from said drive cylinder, an endless sheet magnetizable record member extending around said cylinders and supporting said second cylinder from said drive cylinder, said endless sheet record member having a row of sprocket holes in proximity to one edge thereof for engagement with said sprocket teeth on said second cylinder, a carriage, an electromagnetic transducer head on said carriage mounted for transverse movement across said endless sheet record member, and means interconnecting the carriage and the sprocket teeth to move said carriage across said member in response to rotation of said sprocket teeth.

3. A magnetic recorder comprising a drive cylinder, a second floating cylinder, an endless sheet magnetizable record member extending around said cylinders and supporting said second cylinder from said drive cylinder, said second cylinder having a circumferentially disposed row of sprocket teeth at one end thereof, said second cylinder being disposed parallel to said drive cylinder and mounted for limited movement toward and away from said drive cylinder, an endless sheet magnetizable record member extending around said cylinders and supporting said second cylinder from said drive cylinder, said endless sheet record member having a row of sprocket holes in proximity to one edge thereof for engagement with said sprocket teeth on said second cylinder, and an electromagnetic transducer head mounted for transverse movement across said endless sheet record member, and traversing mechanism for moving said head across said record member as said drive cylinder is rotated, said traversing mechanism being driven from said second cylinder.

4. A magnetic recorder comprising a drive cylinder, a second floating cylinder, an endless sheet magnetizable record member extending around said cylinders and supporting said second cylinder from said drive cylinder, a track mounted in spaced parallel relationship to said drive cylinder, a carriage slidably carried on said track, a lead screw mounted in parallel relationship to said drive cylinder, said carriage including an electromagnetic transducer head and a tracking finger, a lead screw engaged by said tracking finger to advance said carriage along said track when said screw is rotated, power means for rotating said drive cylinder, and a driving connection between said floating cylinder and said lead screw to drive said lead screw from said floating cylinder.

5. A magnetic recorder comprising a drive cylinder supported at one end only, a drive mechanism for rotating said drive cylinder, a second cylinder disposed parallel to said drive cylinder and mounted at one end only for limited movement toward and away from said drive cylinder, the free end of said second cylinder being at the same end as the free end of said drive cylinder, an endless sheet magnetizable record member extending around said cylinders and supporting said second cylinder from said drive cylinder, said endless sheet record member being readily removable from the unsupported end of said cylinders, a track mounted in spaced parallel relationship to said drive cylinder, a carriage slidably carried on said track, an electromagnetic transducer head mounted on said carriage for floating movement toward and away from said drive cylinder and normally supported on said record member as it passes over said drive cylinder, a lead screw mounted for rotational movement about an axis parallel to said drive cylinder, said electromagnetic transducer head including a following finger which extends into engagement with the threads of said lead screw when said head is seated on said record member as it passes over said drive cylinder, and lead screw driving mechanism for driving said lead screw from said second cylinder.

6. A magnetic recorder comprising a drive cylinder supported at one end only, a drive mechanism for rotating said drive cylinder, a second cylinder disposed parallel to said drive cylinder and mounted at one end only for limited movement toward and away from said drive cylinder, the free end of said second cylinder being at the same end as the free end of said drive cylinder, an endless sheet magnetizable record member extending around said cylinders and supporting said second cylinder from said drive cylinder, said endless sheet record member being readily removable from the unsupported end of said cylinders, a track mounted in spaced parallel relationship to said drive cylinder, a carriage slidably carried on said track, an electromagnetic transducer head mounted on said carriage for floating movement toward and away from said drive cylinder and normally supported on said record member as it passes over said drive cylinder, a lead screw mounted for rotational movement about an axis parallel to said drive cylinder, said electromagnetic transducer head including a following finger which extends into engagement with the threads of said lead screw when said head is seated on said record member as it passes over said drive cylinder, sprocket wheels on said lead screw and said second cylinder, and a sprocket chain extending over said sprocket wheel thereby to drive said lead screw from said second cylinder.

References Cited in the file of this patent

UNITED STATES PATENTS

| | | |
|---|---|---|
| 907,383 | Lieb | Dec. 22, 1908 |
| 1,074,424 | Fessenden | Sept. 30, 1913 |
| 2,035,475 | Hay | Mar. 31, 1936 |
| 2,229,293 | Huntley et al. | Jan. 21, 1941 |
| 2,318,828 | Yerkovich | May 11, 1943 |
| 2,323,066 | May | June 29, 1943 |
| 2,335,586 | De Sart | Nov. 30, 1943 |
| 2,359,617 | Bryce | Oct. 3, 1944 |
| 2,431,739 | Eilenberge | Dec. 2, 1947 |
| 2,439,446 | Begun | Apr. 13, 1948 |
| 2,535,480 | Begun | Dec. 26, 1950 |

FOREIGN PATENTS

| | | |
|---|---|---|
| 698,151 | France | Jan. 28, 1931 |